May 2, 1944.  C. E. JOHNSON  2,347,910

SELF-LOCKING VALVE TAPPET

Filed March 23, 1942

Inventor
Charles E. Johnson
By Liesenang and Van Antwerp
Attorneys

Patented May 2, 1944

2,347,910

UNITED STATES PATENT OFFICE 2,347,910

SELF-LOCKING VALVE TAPPET

Charles E. Johnson, North Muskegon, Mich.

Application March 23, 1942, Serial No. 435,796

2 Claims. (Cl. 151—21)

This invention relates to self-locking adjusting screws such as are used in tappets and the like which may be adjusted to a desired position and will remain in such position during service in an internal combustion engine without using a lock nut against the upper end of the tappet body. Such lock nut heretofore largely used disturbs the adjustment previously made and which was correct before the strain imposed by tightening the lock nut. While the invention is shown and described in connection with tappets, it is not restricted solely to such use.

With my invention the tappet consists of two parts only, namely, the tappet body and an adjustable screw which is threaded into the upper end thereof. The tappet body is not changed in construction, being interiorly threaded to receive the adjustable screw, on the head of which the lower end of the valve stem rests in service, but the screw member is of a novel and particularly effective form and construction and cooperates with the interiorly threaded tappet body to effect a very firm and heavy frictional engagement of the two parts which insures against their movement relative to each other after adjustment to place. Such parts of the tappets, however, may be readily adjusted using normal hand wrenches, one on each part for such adjustment at the installation and first adjustment of the tappets in a new engine, and thereafter whenever it needs to be done, for example, after valves and their seats have been ground and a proper readjustment of the tappets with respect to the valves is required.

An understanding of the invention may be had from the following description taken in connection with the accompanying drawing, in which, Fig. 1 is an elevation of a valve tappet embodying my invention of a self-locking adjusting screw.

Like reference characters refer to like parts in the different figures of the drawing.

Figure 1:
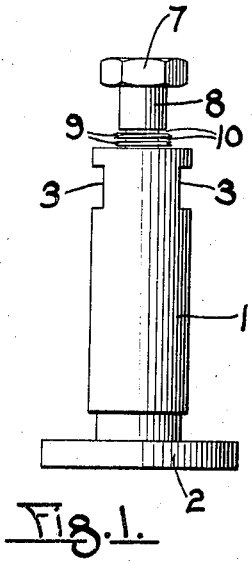
Figure 2:
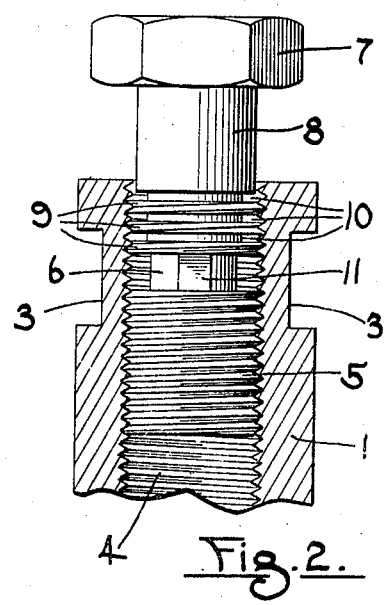
Fig. 2 is an enlarged vertical section of the upper end portion of the tappet body showing in elevation the novel adjustable screw member associated therewith.

The tappet body of conventional construction includes a vertical cylindrical member 1 of desired length with a disk-like enlargement 2 at its lower end which is hardened at its under side. Near the upper end the body is machined at opposite sides as indicated at 3 to provide flat surfaces for wrench engagement. The tappet body from its upper side downwardly is interiorly recessed or bored, and is interiorly threaded, as at 4, with the desired standard or other thread which may be used.

The tappet body does not require any modification or change in structure over what has been previously used; and while I have shown the invention as applied to a tappet body of relatively small diameter requiring the enlarged diameter head 2 at its lower end, it is evident that the invention is applicable to other types of body of larger diameter, large enough so that the lower part of the body is not enlarged but merely hardened at its lower end surface.

The adjustable screw member which is to be inserted into the upper end of the tappet body comprises a shank and a head. The lower part of the shank is exteriorly threaded, as indicated at 5 for a relatively long distance so that preferably there will be several threads in the length of this section of the shank. The threads are cut to mesh the interior threads at 4 of the body 1 and if there were no other threads than this they would screw quite readily and easily into engagement with interior threads 4.

Above such threaded section 5 is a short section 6 of reduced diameter. At the upper end of the screw is a head 7 usually in the form of a bolt head so that it may be engaged by a wrench below which is a short cylindrical section 8, the exterior diameter of which is slightly less than the innermost diameter of the threads 4 of the body, so that the section 8, if it is necessary to adjust the tappet screw downwardly far enough, may pass readily into the upper end of the body 1 without engaging the interior threads 4.

Between such section 8 and the section 6 described is a section which consists of alternate threads 9 with intervening grooves 10. The threads at 9 are cut so as to engage the interior threads 4 of the body 1 and between consecutive threads continuous annular grooves 10 are cut for a distance, which may vary in depth, but at least should be deep enough that the bottoms of the grooves at 10 are inside of the innermost points of the threads 4 of the body 1. The method of producing the threads 9 and the grooves 10 is not a matter of importance in the present invention. For example, the threads on the section 5 and the threads from which the threads 9 are provided are cut in the same operation and the grooves 10 thereafter cut at spaced apart distances. The upper groove 10 will be between the uppermost thread 9 and section 8 as shown.

Figure 3:
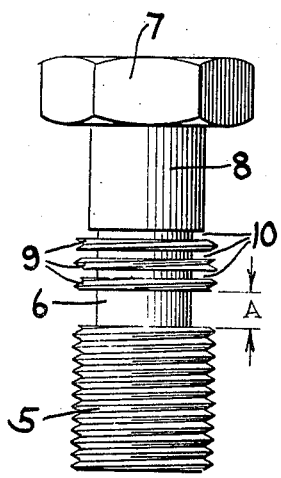
Fig. 3 is an enlarged elevation of the adjustable screw member of the tappet previous to its elongation between its ends.
Figure 4:
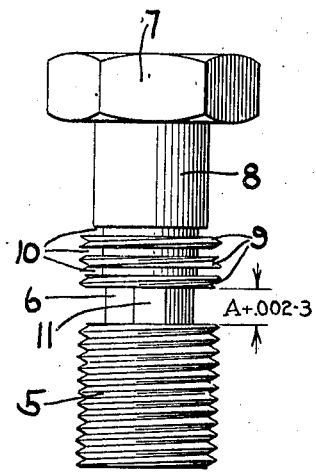
Fig. 4 is a similar view of the screw after it has been elongated a small amount.
Figure 7:
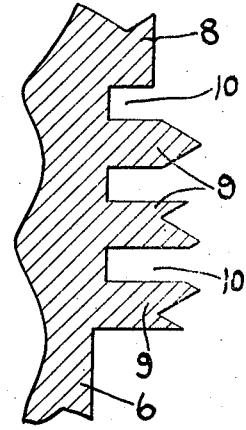
Figure 5:
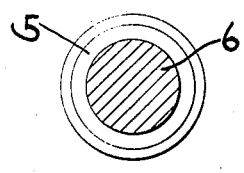
Figs. 5 and 6 are transverse, horizontal sections respectively, through Figs. 3 and 4 at the section of the adjustable screw member where the elongation takes place, and, Fig. 7 is a fragmentary much enlarged, vertical section at one side of the portion of the adjustable screw member of the tappet above the elongated portion thereof.
Figure 6:
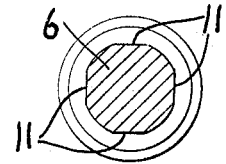

The intermediate section 6 of the shank of the screw is elongated a short distance usually in the approximate neighborhood of .002" or .003" as indicated in Figs. 3 and 4 respectively. In the ordinary tappet used in automobile internal combustion engines an elongation of .004" can be used and in tappets of larger size the elongation may be in many cases, greater than that. The elongating is made by pressure of dies at diametrically opposite sides of the section 6 flattening the part 6, as at 11, at two or four places as shown, or any multiple of two places.

When the tappet screw member is screwed into the upper member of the body 1 the lower exteriorly threaded section 5 thereof enters the body readily and easily and the tappet adjustable screw member may be screwed downwardly until the lowermost of the threads 9 come to the interior threads 4 of the body 1. When it engages with the threads it has the effect, because of the elongation of the intermediate section 6 between the threads at 5 and at 9, of forcing the threads of section 5 downwardly to press at their lower sides against the complementary surfaces of the interior threads 4. The threads 9 in reverse to this press at their upper sides against complementary surfaces of such interior threads 4. As each succeeding thread 9 engages with the interior threads 4 such pressures are increased and multiplied. While three of the threads 9 have been shown it is of course apparent that this number may be varied.

The result of the construction and the action which is produced is to cause a very snug frictional engagement of the threads at 5 and 9 with the interior threads 4 of the body 1 locking the tappet body and the adjustable member associated therewith against relative turning movements with respect to each other, requiring the application of a considerable degree of force when all of the threads 9 are engaged, accomplishing whatever degree of force is necessary to hold the tappet members in positive adjustment.

The grooves 10 separating the threads 9 by their cutting remove support to said threads 9 giving them a slight measure of flexibility which they would otherwise not have. The flexibility is increased of course by a greater depth of said grooves and is decreased by making the grooves shallower. This is a desirable feature of my invention, there being a slight yield of the threads 9 because of the slight flexibility which they have but with retention of ample and sufficient pressure to force the threads of the section 5 downwardly against the interior threads 4 upon which they are seated, whereby the frictional locking against inadvertent rotative movement of one of the tappet parts with respect to the other is assured; and in all cases the load of the valve springs is supported solidly by the lower threads 5 always pressing downwardly on the tappet body threads.

Variation in detail may be resorted to without departing from the invention. For example, the number of the threads 9, the depths of the groove 10, or not using the grooves at all, the elongation of the intermediate section 6 and the number of the threads 5 all may be varied from the detail shown.

The invention is defined in the appended claims and is to be considered comprehensive of all forms of structure coming within their scope.

I claim:

1. A self-locking tappet screw including a head and a depending shank, said shank having upper and lower threaded sections thereon separated from each other with a connecting section between the threaded sections, said upper section having spaced annular grooves cut therein separating the threads of the upper threaded section from each other, and said upper and lower sections being offset a short distance from each other in the direction of the axis of the shank, the connecting section between the threaded sections being axially elongated a short distance after the threaded sections have been produced.

2. In combination, an interiorly threaded tappet body, a self-locking tappet screw screwed into the upper end of said body, the shank of said screw having a lower and an upper threaded section, the threads of which are adapted to engage with the interior threads of the tappet body, said upper threaded section of said shank having a plurality of spaced annular grooves therearound to divide the upper threaded section into a plurality of separated threads each of which thereby becomes capable of flexing away from the normal planes in which they are located, said shank having a connecting section disposed between said upper and lower threaded sections elongated in the direction of the axis of said shank to offset the threads of one section with respect to the other, and causing the threads of the lower section to be forced downwardly against the interior threads of the tappet body and the threads of the upper section to be forced upwardly against the tappet body, as and for the purposes specified.

CHARLES E. JOHNSON.